(12) United States Patent
Heyn et al.

(10) Patent No.: US 8,789,667 B2
(45) Date of Patent: Jul. 29, 2014

(54) ADJUSTABLE DAMPING VALVE DEVICE HAVING AN EMERGENCY OPERATION VALVE

(75) Inventors: Steffen Heyn, Niederwerrn (DE); Andreas Föster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 172 days.

(21) Appl. No.: 13/547,415

(22) Filed: Jul. 12, 2012

(65) Prior Publication Data

US 2013/0015028 A1    Jan. 17, 2013

(30) Foreign Application Priority Data

Jul. 14, 2011    (DE) .......................... 10 2011 079 144

(51) Int. Cl.
    *F16F 9/34*    (2006.01)
(52) U.S. Cl.
    USPC .................................. 188/322.13; 188/282.2
(58) Field of Classification Search
    USPC ................. 188/133.13–322.15, 266.2, 266.5, 188/266.6, 267, 282.2, 313
    See application file for complete search history.

(56) References Cited

U.S. PATENT DOCUMENTS

| 8,181,757 | B2 | 5/2012 | Heyn |
| 2008/0078634 | A1* | 4/2008 | Heyn et al. ................. 188/266.5 |
| 2010/0252766 | A1* | 10/2010 | Forster ..................... 251/129.15 |
| 2011/0168935 | A1 | 7/2011 | Heys |

FOREIGN PATENT DOCUMENTS

DE    102009002582 A1    10/2010

* cited by examiner

*Primary Examiner* — Melanie Torres Williams
(74) *Attorney, Agent, or Firm* — Cozen O'Connor

(57) ABSTRACT

An adjustable damping valve device for a vibration damper includes a housing with an axially movable valve body. The valve body has in the direction of a valve seat surface a pressure-loaded surface $A_{OED}$ which is operative in the lift direction of the valve body and a surface $A_{CloseD}$ which is loaded by pressure in the closing direction, wherein a resultant force comprising a force of at least one valve spring and an actuating force of an actuator acts on the valve body, and wherein an additional surface $A_{CloseD2}$ of the valve body is pressure loaded by damping medium in closing direction of the valve body. The damping valve device has an emergency operation valve by means of which a pressure level can be at least indirectly adjusted in a control space for an emergency operation. The emergency operation valve is operative only in one flow direction.

8 Claims, 1 Drawing Sheet

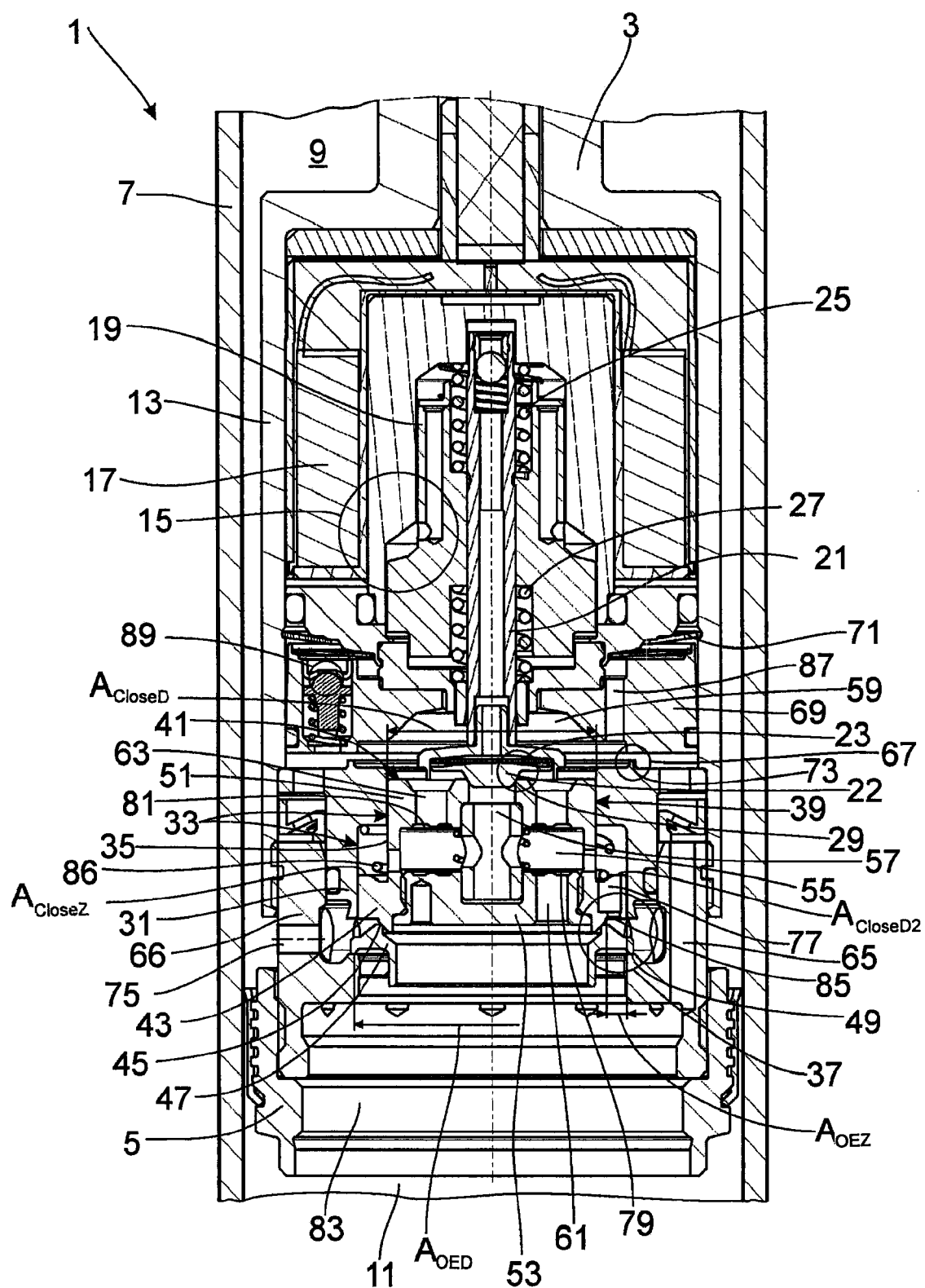

ADJUSTABLE DAMPING VALVE DEVICE HAVING AN EMERGENCY OPERATION VALVE

BACKGROUND OF THE INVENTION

1. Field of the Invention

The present invention is directed to an adjustable damping valve device of a vibration damper which includes an emergency operation valve.

2. Background of the Invention

US2011/0168935A1 describes an adjustable damping valve device which is traversed by flow in two directions. A main stage valve body of the damping valve device is loaded by a mechanical spring force and an opposing actuator force. The resulting actuation force acts in opposition to a hydraulic force that likewise comprises two opposed force components. The main stage valve body has pressure-loaded surfaces which are loaded by damping medium. In so doing, one pressure-loaded surface is used for a closing force component for both through-flow directions. The ratio of the maximum achievable damping force to minimum damping force, also known as spread, is increased by this advantageous design of the damping valve device.

Overall, the adjustable damping valve device is distinguished by its simple construction. In particular, the damping valve device has an emergency operation function in that a large damping force is always adjusted in case of failure of the energy supply for the actuator so that the vehicle can be safely controlled. However, a comparatively large amount of energy must be applied to achieve a soft damping force setting. This operating concept is disadvantageous given the unlikelihood that emergency operation will ever take place.

US2010/0252766A1, the entire content is incorporated herein by reference, shows an adjustable damping valve device having an emergency operation valve which closes an outlet from a control space in the event of failure of the energy supply of the actuator; a throttle resistance of an outlet cross section connected in parallel with the emergency operation valve determines the pressure level in the control space and, therefore, the resulting hydraulic damping force component at the main stage valve body.

It is an object of the present invention to improve a damping valve constructed as per US2011/0168935A1 in such a way that, on the one hand, a soft damping force setting is possible with a low expenditure of energy and, on the other hand, an emergency operation function is possible in case of failure of the energy supply.

SUMMARY OF THE INVENTION

According to the present invention, this object is met in that the damping valve device has an emergency operation valve by means of which a pressure level can be at least indirectly adjusted in a control space of the damping valve for an emergency operation, and the emergency operation valve is operative only in one flow direction of the damping medium.

A damping force adjustment deviating from the maximum soft damping force characteristic or from the maximum hard damping force characteristic can be achieved by the emergency operation valve. In normal operation, the damping valve device can be operated with a comparatively low application of energy because of the design of the spring force and effective direction of the valve spring. Construction is substantially simplified by limiting the action of the emergency operation valve to one flow direction of the damping medium.

In another advantageous embodiment, the additional surface $A_{CloseD2}$ of the valve body can be acted upon by damping medium along at least two flow paths, whereby one flow path can be influenced by an emergency operation valve. Using a plurality of flow paths to the additional surface $A_{CloseD2}$ increases the dynamics of the damping valve device.

According to another advantageous embodiment, a rear space receives the back side of the valve body and has a flow connection as inlet and outlet with a working chamber of the vibration damper. The dual function of the flow connection likewise substantially simplifies construction.

A check valve which releases a damping medium flow from the rear space in direction of the additional surface $A_{CloseD2}$ can be connected to the rear space. As a result of this constructional step, the lift movement of the valve body can take place without retardation because no damping medium volume is enclosed in the rear space without the possibility of flowing out.

To minimize production effort, two feed flow channel systems to the additional surface $A_{CloseD2}$ are constructed in the valve body for a flow direction of the damping medium.

In another advantageous embodiment, the valve body is constructed so as to comprise two shells, and a damping medium flow path is formed in a separation plane. The two-shelled construction facilitates production of the valve body.

A step for maximizing the valve dynamics consists in that the damping medium flow path to the additional surface $A_{CloseD2}$ has an outlet throttle in the flow direction with respect to the additional surface $A_{CloseD2}$.

Further, the flow paths inside the damping valve device can be carried out in a simple manner in that a pressure-loaded surface $A_{OEZ}$ is formed at the valve body and an opening to the control space is formed by means of a shared connection orifice.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described more fully with reference to the drawing which shows a sectional view of the damping valve of the present invention.

DETAILED DESCRIPTION OF THE PRESENTLY PREFERRED EMBODIMENTS

The drawing shows a damping valve device 1 which is fastened, e.g., to a piston rod 3 of a vibration damper, shown only partially. The damping valve device 1 comprises a piston 5 which divides a cylinder 7 into a working chamber 9 on the piston rod side and a working chamber 11 remote of the piston rod, both of which working chambers 9, 11 are filled with damping medium. In this embodiment, the damping valve device is fastened to the piston rod 3, but the invention is not limited to an arrangement of this kind.

An actuator 15 of optional design is arranged in an outer housing 13; serving as actuator in this example is a magnetic coil 17 which exerts a force on an axially movable armature 19, this force being transmitted to a two-part auxiliary valve body 21 of an auxiliary valve 23. At least one valve spring—in this embodiment, two opposing valve springs 25, 27 are used—tensions the auxiliary valve body 21 in the lift direction with respect to an auxiliary valve surface 29 of the auxiliary valve 23. The actuator 15 acts in the closing direction of the auxiliary valve 23. The force of the at least one valve spring 25, 27 and the force of the actuator 15 form a resultant force which acts on the auxiliary valve body 21 in the lift direction.

A stepped opening 33 in which a valve body 35 of a main stage valve body 37 can execute an axial movement is formed in an inner housing 31 of the damping valve device 1. The valve body 35 has a guide sleeve 39 whose back side 41 forms an additional surface $A_{CloseD}$ that is pressure-loaded by damping medium. Further, the valve body 35 has a radial shoulder 43 which has an additional pressure-loaded surface $A_{CloseD2}$ in the direction of the back side 41.

In a neutral position of the piston rod 3, i.e., without opening force, the valve body 35 contacts a valve seat surface 45 of an axially movable valve ring 47 which contacts a housing-side valve seat surface 49 at the side of the axially movable valve ring 47 facing in direction of the working chamber 11 remote of the piston rod.

The valve body 35 is constructed in a two-shelled manner. An outer cup 51 forms the guide sleeve 39 and the radial shoulder 43. In a separation plane, an inner disk 53 defines with the cup 51 a radial damping medium flow path 55 between the additional pressure-loaded surface $A_{CloseD2}$ and a control space 57 whose outlet cross section is determined by the valve body 21 in direction of a rear space 59.

The additional surface $A_{CloseD2}$ of the valve body 35 can be acted upon with damping medium via at least two flow paths. A first feed flow channel 61 is formed directly in the valve body 35 as an axial passage. A second feed flow channel 63 extends on a partial portion inside the valve body 35 between the rear space 59 of the main stage valve 37 and the damping medium flow path 55. A flow connection 65 of the rear space 59 to the working chamber 11 remote of the piston rod inside a connection sleeve 66 between the outer housing 13 and the piston 5 is controlled by an emergency operation valve 67. The emergency operation valve 67 is formed by a valve ring 69 which is lifted from an emergency operation valve seat surface 73 by the actuator 15 against the force of at least one closing spring 71. Even a slight application of energy for the actuator 15 is sufficient to achieve the lift movement of the valve ring 69. In this example, the magnetic force of the magnetic coil 17 acts on the valve ring 69. As a result of apt dimensioning of the spring forces and magnetic forces, a strict separation can be achieved between an emergency operating state and a normal operating state. In this way, the flow path between the rear space 59 and the working chamber 11 remote of the piston rod can be influenced by means of the emergency operation valve 67.

At least one connection orifice 75 leading from the working chamber 9 on the piston rod side to the pressure-loaded surface $A_{OEZ}$ at the underside of the radial shoulder and to the control space 57 is formed in the connection sleeve 66 of the damping valve device 1. For this purpose, the main stage valve body 37 has at least one axial opening 77 in the region of the radial shoulder 43.

The feed flow channels 61, 63 are safeguarded by check valves 79, 81 so that the damping medium does not escape through the feed flow channels 61, 63 in the valve body 35 in direction of the working chamber 11 remote of the piston rod when there is flow via the connection orifice 75. Therefore, the check valve 81 is connected via the feed flow channel 63 to the rear space 59 which is part of the second feed flow channel. When damping medium flows out of the rear space 59 in direction of the additional surface $A_{CloseD2}$, the check valve 81 opens the flow path.

There are four basic operating states to be considered. A first operating state of the damping valve device 1 is characterized by a damping medium flow proceeding from the working chamber 11 remote of the piston rod via a port 83 to the valve ring 47 and valve body 35. The emergency operation valve 67 is switched on, i.e., it is lifted from its emergency operation valve seat surface 73 as in the illustrated position, and the actuator 15 acts against the force of the valve springs 25, 27. The damping medium flows along the first feed flow channel 61 in the valve body 35 and the opened check valve 79, then further along the damping medium flow path 55 to the additional valve closing surface $A_{CloseD2}$. The pressure on this valve closing surface $A_{CloseD2}$ exerts a first closing force component . Further, damping medium flows through the flow connection 65 in the connection sleeve 66 and through the opened emergency operation valve 67 into the rear space 59, then through the open check valve 81 to the additionally pressure-loaded surface $A_{CloseD2}$. As was already described, the back side 41 of the valve body 35 represents the pressure-loaded surface $A_{CloseD}$. The closing force acting on the valve body 35 is composed of the resultant closing force which acts directly on the back side 41 of the valve body 35 via the auxiliary valve body and the pressure forces acting on surfaces $A_{CloseD}$ and $A_{CloseD2}$. Because of the comparatively low throttle losses, the pressure levels at surfaces $A_{CloseD}$ and $A_{CloseD2}$ are similar to that in the working chamber remote of the piston rod, among other reasons because the damping medium flow path to the additional surface $A_{CloseD2}$ has an outlet throttle 85 in the flow direction with respect to the additional surface $A_{CloseD2}$. A surface $A_{OED}$ at the valve ring 47 is slightly larger than the sum of surfaces $A_{CloseD}$ and $A_{CloseD2}$ so as to prevent blocking of the lift movement of the valve body 35 due to the pressure ratios. The pressure in the control space 57 of the main stage valve body 35 plays no part in this flow direction of the damping valve device because the auxiliary valve 21 is bypassed by the flow connection 65 to the rear space 59.

A second operating state is the emergency operating state of the damping valve device 1 and of a damping medium flow through the damping valve device 1 proceeding from port 83. The emergency operation valve 67 is closed due to the absence of energy input via the actuator 15. The auxiliary valve body 22 is guided so as to be slightly displaceable axially inside the auxiliary valve body 21. In the deenergized state of the magnetic coil 17, the valve springs 25, 27 hold the auxiliary valve body 21, considered statically, i.e., without incident hydraulic flow, at a maximum distance from the auxiliary valve seat surface 29. Therefore, the auxiliary valve body 22 can occupy a maximum lift position when loaded even by the slightest pressure proceeding from the control space 57. Valve 29 is closed or slightly open depending on the adjustment of the valve springs 25, 27. As in the normal operating state, the damping medium reaches the additional pressure-loaded surface $A_{CloseD2}$ via the feed flow channel 61 in the valve body 35 and the open check valve 79. In order that the valve body 35 together with the valve ring 47 can lift off from the housing-side valve seat surface 49 regardless of the switching position of the emergency operation valve 67, the check valve 81 in valve body 35 opens so that damping medium which is displaced from the rear space 59 can flow off via the feed flow channel 63 in valve body 35 in direction of the additional pressure-loaded surface $A_{CloseD2}$.

The third operating state concerns a damping medium flow through the damping valve device 1 proceeding from the working chamber 9 on the piston rod side and open emergency operation valve 67. The damping medium flows through the connection orifice 75 in the connection sleeve 66 to the pressure-loaded surface $A_{OEZ}$ at the radial shoulder 43 and then to the pressure-loaded surface which now functionally forms a closing surface $A_{CloseZ}$. The pressure-loaded surface at the radial shoulder of the main stage valve body is operative for both flow directions of the damping valve device. Depending on the energy supply of the actuator 15, there ensues an auxiliary valve position which permits control of the pressure in the control space 57 and accordingly also at the pressure-loaded surface $A_{CloseZ}$. The pressure acting on an annular surface $A_{OEZ}$ opposes the pressure acting in the closing direction on surface $A_{CloseZ}$. Because of the outlet throttle 85 which now functions as an inlet throttle, there is a pressure gradient between the pressures at surfaces $A_{OEZ}$ and $A_{CloseZ}$ when the auxiliary valve 23 is open so that the hydraulic opening force at the valve body 35 is always somewhat greater than the hydraulic closing force. The pressure in the connection orifice 75 also acts on the valve ring 47 which is accordingly pressed on the housing-side valve seat surface 49. Therefore, the valve body 35 lifts from the valve seat surface 45 of the valve ring 47.

The damping medium flowing out of the control space 57 through the auxiliary valve 23 arrives in the rear space 59 and through the open emergency operation valve 67 and flow connection 65 in the connection sleeve 66 into the working chamber 11 remote of the piston rod. Consequently, the rear space 59 has an inlet and an outlet with the working chamber 11 of the vibration damper.

In the fourth operating state, the feed flow again takes place via the connection orifice 75 in the connection sleeve 66, but the emergency operation valve 67 is closed. The flow path to the auxiliary valve 23 corresponds to the description of the third operating state. In contrast, the auxiliary valve 23 is opened to the maximum degree due to the lack of power supply of the actuator 17. A closing spring 86 ensures that the main stage valve body 35 together with the valve ring 47 are seated on the housing-side valve seat surface 49. This prevents a hydraulic short circuit between the working chambers via the connection orifice 75. The damping medium arrives in the rear space 59 whose outlet is blocked by the closed emergency operation valve 67. A flow path 87 to a pressure limiting valve 89 by which a defined pressure level can be determined in the rear space 59 is formed in the valve ring 69 of the emergency operation valve 67. The pressure level in the rear space 59 and, therefore, on the back side 41 of the valve body 35 and on the pressure-loaded surface at the radial shoulder $A_{CloseZ}$ determines the closing force in emergency operation of the damping valve device 1. It is clear from a comparison of the second operating state and fourth operating state that the emergency operation valve is effective only in one flow direction of the damping valve device 1 via the connection orifice 75. Tests have shown that this design of the damping valve device 1 is suitable for reliable operating behavior of a vibration damper.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An adjustable damping valve device (1) for a vibration damper, comprising:
a valve body (35);
a housing (31) having a stepped opening (33) in which the valve body (35) is guided so as to be axially movable by a guide sleeve (39) and a radially outwardly directed shoulder (43), wherein the valve body (35) has a pressure-loaded surface ($A_{OED}$) in a direction of a valve seat surface (49) inside a contact surface between the valve body (35, 45) and the valve seat surface (49), the pressure loaded surface being operative in the lift direction of the valve body (35, 47) and is impinged by damping medium from a port (83) inside a cross section limited by a valve seat surface (49), and a surface ($A_{CloseD}$) which is operative with a diameter of the guide sleeve (39) that is loaded by pressure in a closing direction formed by a back side (41) of the valve body (35);
at least one valve spring (25, 27) and an actuator (15) each configured to have respective forces that act on the valve body (35, 47);
an additional surface ($A_{CloseD2}$) of the valve body (35, 45) that is pressure loaded by damping medium in closing direction of the valve body (35, 45) when the valve body (35, 45) is impinged by damping medium flow via the port (83);
said damping device (1) further comprising an emergency operation valve (67) configured so that a pressure level is at least indirectly adjustable in a control space of said damping device (1); and wherein said emergency operation valve (67) is operative only in one flow direction of said damping medium.

2. The damping valve device according to claim 1, wherein the additional surface ($A_{CloseD2}$) of the valve body (35) can be acted upon by damping medium along at least two flow paths (61, 65, 59, 63) and wherein one flow path (63, 59, 63) can be influenced by the emergency operation valve (67).

3. The damping valve device according to claim 1, additionally comprising a rear space (59) for receiving the back side (41) of the valve body (35), the rear space (59) having a flow connection (65) serving as inlet and outlet with a working chamber (11) of the vibration damper.

4. The damping valve device according to claim 2, additionally comprising a check valve (81) for releasing a damping medium flow from the rear space (59) in direction of the additional surface ($A_{CloseD2}$) connected to the rear space (59).

5. The damping valve device according to claim 1, additionally comprising two feed flow channel systems (61, 63) constructed in the valve body (35) for leading damping medium flow to the additional surface ($A_{CloseD2}$).

6. The damping valve device according to claim 1, wherein the valve body (35) is constructed in a two-shelled manner having a separation plane; said damping valve device further comprising a damping medium flow path (55) formed in the separation plane.

7. The damping valve device according to claim 6, wherein the damping medium flow path (55) to the additional surface ($A_{CloseD2}$) has an outlet throttle (85) in a flow direction with respect to the additional surface ($A_{CloseD2}$).

8. The damping valve device according to claim 1, additionally comprising a control space (55) having an opening (77), and a pressure-loaded surface ($A_{OEZ}$) formed at the valve body (35); and a connection orifice (75) leading to the control space (55) via the opening (77).

* * * * *